United States Patent [19]

Dearman

[11] 3,901,497
[45] Aug. 26, 1975

[54] PIPE CLAMPING APPARATUS

[76] Inventor: Timothy C. Dearman, 4191 E. Stanley Rd., Mount Morris, Mich. 48458

[22] Filed: Apr. 6, 1973

[21] Appl. No.: 348,524

[52] U.S. Cl. .................. 269/37; 269/130; 228/4; 228/44; 228/49; 29/200 P
[51] Int. Cl.² ............................................ B25B 1/20
[58] Field of Search .............. 269/37, 43, 130, 131; 228/4, 44, 49; 29/200 P; 144/306, 307

[56] References Cited
UNITED STATES PATENTS

| | | | |
|---|---|---|---|
| 990,186 | 4/1911 | Berg | 144/307 |
| 3,593,402 | 7/1971 | Mori | 228/4 X |
| 3,666,159 | 5/1972 | Watson | 228/49 |
| 3,704,503 | 12/1972 | Haywood | 228/4 X |
| 3,705,453 | 12/1972 | Olson | 269/131 X |
| 3,711,920 | 1/1973 | Simmons, Jr. | 29/200 P |

Primary Examiner—Francis S. Husar
Assistant Examiner—Gus T. Hampilos
Attorney, Agent, or Firm—Learman & McCulloch

[57] ABSTRACT

Pipe clamping apparatus for use in welding the confronting ends of pipe members to one another comprises a clamping chain structure adapted to embrace one of the pipe members adjacent one end thereof and carrying a number of support members which extend axially of the pipe members and span the joint therebetween, each of the support members having adjustable members engageable with the other pipe member for maintaining the latter in axial alignment with the first pipe member. The support members carry spacing members adjustable longitudinally of the support members and operable to enter the joint between the two pipe members and space the confronting ends thereof a predetermined distance apart.

14 Claims, 4 Drawing Figures

PATENTED AUG 26 1975 3,901,497
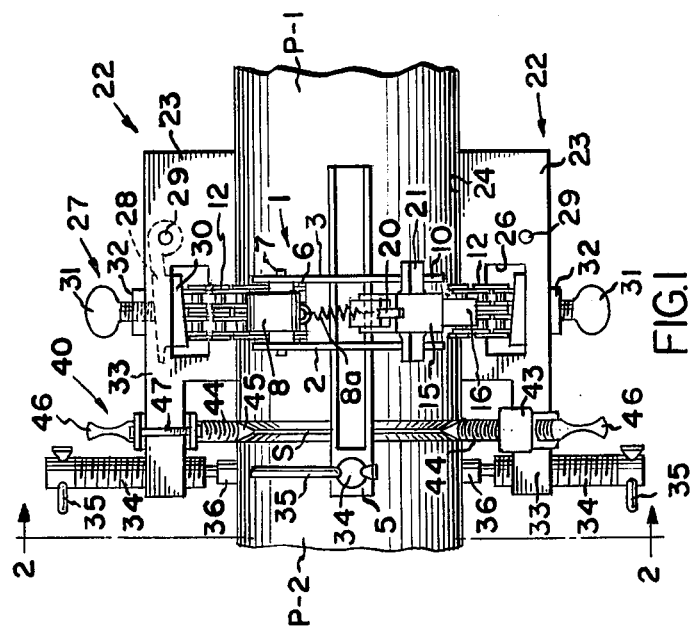

3,901,497

PIPE CLAMPING APPARATUS

The invention disclosed herein relates to clamping apparatus adapted for use in welding two pipe members to one another and more particularly to such clamping apparatus which is operable not only to maintain the two pipe members in axial alignment, but also to space the confronting ends of the two pipe members a predetermined distance apart so as to enable welding material to occupy completely the space between the confronting ends of the pipe members.

In the welding of pipe members to one another it is essential that the confronting ends of the pipe be coplanar so as to avoid irregular and improper fitting of one pipe member to the other. The alignment of the pipe members conventionally is achieved by means of a clamp composed of one or more chains which embrace one or both of the pipe members and which carry support bars which span the joint between the two pipe members. The support bars conventionally include threaded screws which are adjustable radially of the pipe members and which act on either or both of the pipe members so as to adjust them relatively to one another to a position in which their axes are aligned. Typical clamps of this kind are disclosed in U.S. Pat. Nos. 3,653,574 and 3,705,453.

When welding fairly thick wall pipes to one another, it is desirable that the weldment be as thick as the pipe walls so as to strengthen the joint between the pipe members and to avoid an annular groove at the inner surface of the joint. This result may be achieved by beveling the confronting ends of the pipe members, or by spacing the confronting ends of the pipe members a short distance apart, or both.

Some of the known pipe clamps are equipped with means for spacing the confronting ends of the pipes to be welded, but such pipe clamps do not provide for adjustment of the spacing means relatively to their supporting means. If the confronting ends of a pair of pipes are to be spaced apart while having their axes maintained in alignment, two spacing tools spaced substantially 180° apart should be used. If the spacing tools cannot be adjusted relatively to their supporting means and longitudinally of the pipes, then great care must be exercised in fitting the pipe clamp to the pipe members so that the joint between the pipes and the spacing tools will lie, as much as possible, in the same plane extending transversely to the longitudinal axis of the pipes. Pipe clamps frequently are extremely heavy and difficult to adjust once they are mounted on the pipes. Consequently, considerable time may be required to effect adjustment of the clamps so that their spacing tools are oriented properly with respect to the joint between the pipes to be joined.

An object of this invention is to provide clamp apparatus for use in joining a pair of pipe members to one another and having spacing tools operable to space the confronting ends of the pipe members from one another, the spacing tools being adjustable relatively to the clamp so as to assure proper orientation of the spacing tools and the ends of the pipe members without having to adjust the clamps longitudinally of the pipes.

Another object of the invention is to provide a pipe clamp of the character described which is capable of use with pipes of greatly differing diameter.

A further object of the invention is to provide a pipe clamp of the kind referred to having improved means for effecting alignment of two confronting pipe members.

Other objects and advantages of the invention will be pointed out specifically or will become apparent from the following descriptioon when it is considered in conjunction with the appended claims and the accompanying drawings, in which:

FIG. 1 is a top plan view of clamp apparatus constructed in accordance with one embodiment of the invention and fitted to a pair of pipes to be joined to one another;

FIG. 2 is a sectional view taken on the line 2—2 of FIG. 1;

FIG. 3 is an isometric view of a spacer tool constructed according to the invention; and FIG. 4 is an isometric view of a modified form of pipe support member.

Apparatus constructed in accordance with the embodiment shown in FIGS. 1–3 comprises a body 1 comprising a pair of parallel plates 2 and 3 having aligned slots 4 in which is accommodated a bar 5 to which the plates are welded. Corresponding ends of the plates 2 and 3 are spanned by a cylindrical spool member 6 and adjacent the latter is a rock shaft 7 on which is mounted a lever 8 terminating at the end adjacent the spool 6 in a toothed latch pawl 9. The lever 8 is yieldably urged toward the spool 6 by a spring 8a. The opposite ends of the plates 2 and 3 are provided with upstanding ears 10 for a purpose presently to be described. Those edges of the plates 2 and 3 adjacent the slots 4 are inclined so as to diverge outwardly of the slots 4 as at 11, thereby enabling the body 1 to be mounted on pipes of greatly varying diameter.

Adapted for cooperation with the body 1 is a flexible support chain 12 one end 13 of which is free and the opposite end of which is joined to an adjusting mechanism 14. The adjusting mechanism comprises a preferably square sleeve 15 within which is slidably accommodated a similar shaped slide 16. One end of the slide 16 is secured to the chain 12 and the other end of the slide is threaded for the accommodation of a correspondingly threaded screw 17 that is rotatably trapped in an end cap 18 secured to the sleeve 15. The screw 17 has a head 19 which bears against the cap 18 and is equipped with an operating handle 20 by means of which the screw 17 may be rotated so as to effect movement of the slide 16 longitudinally of the sleeve 15. The sleeve 15 is provided with a pair of laterally projecting fingers 21 which are adapted to engage the ears 10 on the plates 2 and 3.

A plurality of support members 22 are carried by the chain 12. Each of the support members comprises an elongate, longitudinally grooved body 23 having opposite side edges 24 and 25. The body is provided with a transverse opening 26 through which the chain 12 may extend. The opening 26 is between the edges 24 and 25 and is of such size as freely to accommodate the chain 12 so as to enable the support bars 22 to be adjusted to any one of a selected number of positions longitudinally of the chain. Each of the support bars 22 includes latch means 27, however, for securing the support bar in the selected position on the chain.

Each of the latching means comprises a lever 28 pivoted as at 29 to the body 23 and having a pad 30 that is adapted to bear against the chain 12. A locking screw 31 is mounted in a threaded member 32 extending transversely of the body 23, the screw being engageable with the lever 28 for releasably holding the latter in latching engagement with the chain 12.

Each of the support bars 22 includes an extension 33 which is of less thickness than the remaining portion of the body 23 and at the free end of which is accommodated a threaded adjusting screw 34 having an operating handle 35 at one end and a swivelable pad 36 at its other end. The bar 5 previously referred to has a configuration in side elevation like that of the bars 22 and is provided with parts 34 - 36 like those of the bars 22.

To condition the apparatus thus far described for operation in welding two pipe members P-1 and P-2 to one another, the free end 13 of the chain 12 is introduced between the plates 2 and 3 of the body 1 so as partially to embrace the spool 6, and the adjusting mechanism 14 is introduced between the plates 2 and 3 with the arms 21 engaging the ears 10. The ears 10 thus provide a separable support for the mechanism 14. The toothed pawl 9 latches the chain against the spool 6 so that the chain, together with the body 1, forms a loop L of a diameter greater than that of the pipe P-1 and with the support bars 22 circumferentially spaced from one another about the loop L. The loop L then is fitted over the pipe P-1 and is located in such position relative thereto that the edges 24 of the support bars 22 overlie the pipe P-1, but the adjusting screws 34 project beyond the end of the pipe P-1. A force then may be exerted on the free end 13 of the chain 12 so as to reduce the diameter of the loop L.

Before drawing the loop L snugly about the pipe P-1, the locking screws 31 of the support bars 22 should be loosened so as to release the latch pads 30 and enable the support bars to be adjusted circumferentially of the loop to the desired positions. Thereafter, the loop L may be drawn as snugly about the pipe P-1 as is possible by exerting a force on the free end 13 of the chain, and the chain will be retained in such position by the engagement of the toothed pawl 9.

When the loop L has been drawn as snugly as possible about the pipe P-1 by manipulation of its free end, the fine adjusting mechanism 14 then may be manipulated so as to cause the slide 16 to be drawn inwardly into the sleeve 15, thereby diminishing further the diameter of the loop L and causing the support bars 22 to be clamped tightly against the outer surface of the pipe.

Following clamping of the support bars 22 on the pipe p-1, the second pipe member P-2 may be presented in end-to-end confrontation with the pipe P-1. The adjusting screws 34 may be manipulated so as to cause the pads 36 to engage the pipe P-2 adjacent its end and adjust the pipe P-2 in such manner that its axis coincides with the axis of the pipe P-1. The pipe member P-2 may be either a straight pipe length or a fitting of known kind and it may be supported at a location removed from the pipe P-1 by any suitable means.

Spacer tool means 40 is provided on two or more of the support bars 22 to effect spacing of the confronting ends of the pipes P-1 and P-2. Each of the spacing means comprises a generally U-shaped harness comprising a pair of spaced apart, parallel bars 41 and 42 joined at corresponding ends to a block 43 having a threaded opening therethrough. Accommodated in the threaded opening of the block is a correspondingly threaded screw 44 having a conically tapered free end 45 and a finger piece 46 at its other end. The bars 41 and 42 straddle the extension 33 of the associated body 23 and are joined at their free ends by a bolt 47.

As is best shown in FIG. 2, the spacing between the bars 41 and 42 and the spacing between the block 43 and the bolt 47 are such that the spacing tool 40 is loosely mounted on the extension 33. The spacing tool thus is slidable longitudinally of the extension 33 and is rockable relatively thereto from side to side.

To operate the spacing tools 40, they may be adjusted longitudinally of the extension 33 of the associated support bar 22 so that the conical ends 45 lie in the plane of the joint between the two pipes P-1 and P-2. The screws 44 then may be rotated in such direction so as to cause the conical ends 45 to enter the joint and force the confronting ends of the two pipes away from one another to form a space S therebetween.

As is best illustrated in FIG. 2, each spacer screw 44 is so mounted on its associated support bar 22 that the screw is located at one side of the bar. However, each of the blocks 43 is so oriented with respect to the bars 41 and 42 that the plane defined by the longitudinal axis of each screw 44 is inclined relatively to the plane defined by the longitudinal axis of the associated support bar 22. Preferably, the inclination of each screw 22 is such that the plane of its longitudinal axis extends along a line which substantially intersects the plane of the longitudinal axis of the support bar 22 at the longitudinal axis of the pipe P-1. Thus, adjustment of each screw 44 toward the pipes enables the conical point 45 to enter the joint between the pipes. The loose mounting of the spacer tool on its associated support bar enables this relationship to be achieved on pipes of considerably different diameter.

The support bar 22 disclosed in FIG. 4 is the same as that previously described, with the exception that the support bar is provided with a second or auxiliary adjusting screw 34a longitudinally spaced from the screw 34. The screw 34a terminates at one end in swivelable pad 36a and has an operating handle 35a at its opposite end. The adjusting screw 34a is so mounted with respect to the extension 33 that the screw 34a may engage the same pipe on which the supporting chain 12 is mounted, thereby providing for adjustable screws adjacent the confronting ends of each of two pipe sections. In this embodiment, the spacing tool 40 is interposed between the adjusting screws 34, 34a, but the spacing tool nevertheless is longitudinally and rockably adjustable relatively to the bar 22 as is indicated in dotted lines in FIG. 4.

When using apparatus corresponding to the invention, the chain 12 need be positioned only approximately with respect to the joint between the adjacent pipes inasmuch as the adjustability of the spacing tools 40 permits them to be shifted to a position in which they lie in the same plane as the joint between the pipes.

The disclosed embodiments are representative of the presently preferred forms of the invention, but are intended to be illustrative rather than definitive thereof. The invention is defined in the claims.

I claim:

1. Apparatus for use in welding to one another confronting ends of a pair of pipe members having a joint therebetween, said apparatus comprising clamp means forming a loop of such size as to encircle one of said pipe members; a plurality of elongate support members carried by said clamp means and extending axially of said loop a distance sufficient to span the joint between and engage both of said pipe members; spacer means for each of a selected number of said support members; and means mounting each of said spacer means on the associated support member for movement axially of said loop to a position in which said spacer means may overlie the joint and for movement radially inwardly of said loop to a position in which said spacer means may enter the joint and space the confronting ends of said pipe members apart.

2. Apparatus according to claim 1 wherein said clamp means comprises a flexible chain.

3. Apparatus according to claim 1 including releasable latch means acting between said clamp means and selected ones of said support members for enabling adjustment of the latter relatively to said clamp means.

4. Apparatus according to claim 1 wherein the mounting means for each of said spacer means mounts the latter to one side of the associated support member.

5. Apparatus according to claim 1 wherein each of said spacer means comprises a member having one end thereof tapered in a direction toward said pipe lengths.

6. Apparatus according to claim 5 wherein each of said spacer means comprises a screw threaded member.

7. Apparatus according to claim 1 including at least one adjusting member carried by each of said support members for movement relative thereto into and out of engagement with one of said pipe lengths.

8. Apparatus according to claim 7 wherein a selected number of said support members carry a second adjusting member spaced from the first mentioned adjusting member and movable into and out of engagement with the other of said pipe lengths.

9. Apparatus according to claim 8 wherein the spacer means is mounted between the first mentioned and said second adjusting members.

10. Apparatus according to claim 1 wherein said mounting means comprises a harness slidable longitudinally of the associated support member.

11. Apparatus for spacing apart a pair of pipe members arranged in end to end relation with a joint therebetween said apparatus comprising an elongate support member adapted to overlie both of said pipe members and span said joint; movable spacing means for entering said joint and moving said pipe members apart; and means mounting said spacing means for movement both longitudinally of and rockably relative to said support member, said mounting means comprising a harness loosely embracing said support member.

12. Apparatus according to claim 11 wherein said support member has a longitudinal axis defining a first plane and wherein said spacing means is mounted to one side of said support member for movement in a second plane which intersects said first plane.

13. Apparatus according to claim 11 wherein said spacing means comprises an elongate member tapered at one end.

14. Apparatus for use in joining to one another confronting ends of a pair of pipe members having a joint therebetween, said apparatus comprising clamp means forming a loop of such size as to encircle one of said pipe members; a plurality of elongate support members slidably carried by said clamp means for movement circumferentially of said loop, each of said support members extending axially of said loop a distance sufficient to span the joint between said pipe members; means for releasably latching said support members in selected positions of slidable adjustment relative to said clamp means; spacer means for each of a selected number of said support members operable to enter the joint between said pipe members and space the confronting ends of said pipe members from one another; and means mounting said spacer means on the associated support members for movement longitudinally of the latter.

* * * * *